Aug. 1, 1967     J. A. SAINTSBURY     3,333,414
AERODYNAMIC FLOW REVERSER AND SMOOTHER
Filed Oct. 13, 1965

INVENTOR
John A. SAINTSBURY
BY
ATTORNEY 3,333,414
AERODYNAMIC FLOW REVERSER
AND SMOOTHER
John A. Saintsbury, St. Bruno, Quebec, Canada, assignor to United Aircraft of Canada Limited, Quebec, Quebec, Canada
Filed Oct. 13, 1965, Ser. No. 495,393
6 Claims. (Cl. 60—39.65)

The present invention relates to the control of fluid streams, for example, high velocity air flows as may occur in the construction of jet engines or the like and more particularly to a control for reversing or smoothing high velocity fluid streams in combustion chambers of the annular reverse-flow type as used in certain jet or gas turbine engines.

To inject air into reverse-flow combustion chambers without losses in pressure and the creation of turbulence in areas where it is not required has always been a major problem. Normally, air entering through conventional ports in the walls of an annular reverse-flow combustion chamber enters at an angle to the vertical centerline of the port in the same direction as the flow. However, the flow in the combustion chamber is being forced in a reverse direction towards the impeller inlet adjacent the combustion chamber. The incoming air, meeting the flow in a reverse direction, causes the formation of undesirable vortices or turbulence in the flow of combusted gases within the combustion chamber.

The present construction aims to provide a reverse-flow annular combustion chamber whereby some of the incoming air injected in the form of jets into the combustion chamber is injected at an angle to the vertical centerline in a direction reversed of its original flow pattern, but in the direction of the flow of the combusted gases in the combustion chamber. Thus, further turbulence is prevented and existing turbulence caused by air entering through the conventional ports is lessened considerably by the action of the jets of air on the flow. Directional precision is also achieved by positioning of the holes in the present construction.

It has been proposed to use conventional controls for reversing part of the flow into the combustion chamber. However, baffles, vanes, tubes or other mechanical deflection means are usually needed to change the direction of high velocity fluid streams. Due to the extremely high friction and stress characteristics of such high velocity fluids, materials of very high anti-stress and anti-frictional properties must be used in the construction of most such mechanical deflection means. Furthermore, the addition of such mechanical deflection means necessarily increases the weight of the apparatus which is, of course, a disadvantage when used in engines of this nature.

The present invention further aims to provide a fluid flow control which eliminates the use of any mechanical deflection means to reverse the flow of the fluid.

In accordance with the construction of the present invention, the combustion chamber comprises a smooth outer surface and means for directing a flow of fluid along the surface. The surface is provided with a recessed portion extending in a direction normal to the flow path whereby it causes a fluid vortex to be formed. Port means are provided in the recessed portion of the surface for diverting the fluid tangentially from the so-formed vortex and at an angle in a reverse direction relative to the original fluid flow.

Having thus generally described the nature of the invention, particular reference will now be made to the accompanying drawings showing, by way of illustration, a preferred embodiment thereof, and in which.

Figures 1, 4:
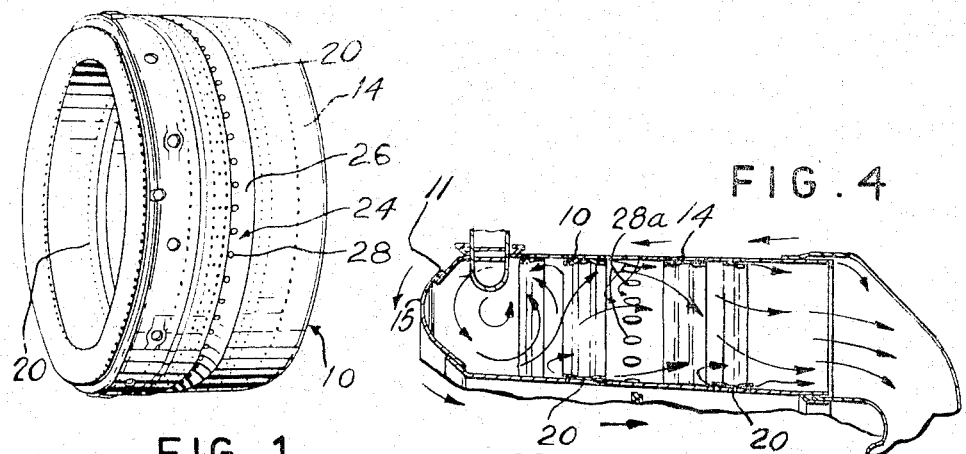
FIGURE 1 is a perspective view of a combustion chamber casing from a typical turbine engine embodying the construction of the present invention.
FIGURE 4 is an enlarged partial schematic view of the conventional annular reverse-flow combustion chamber.
Figure 2:
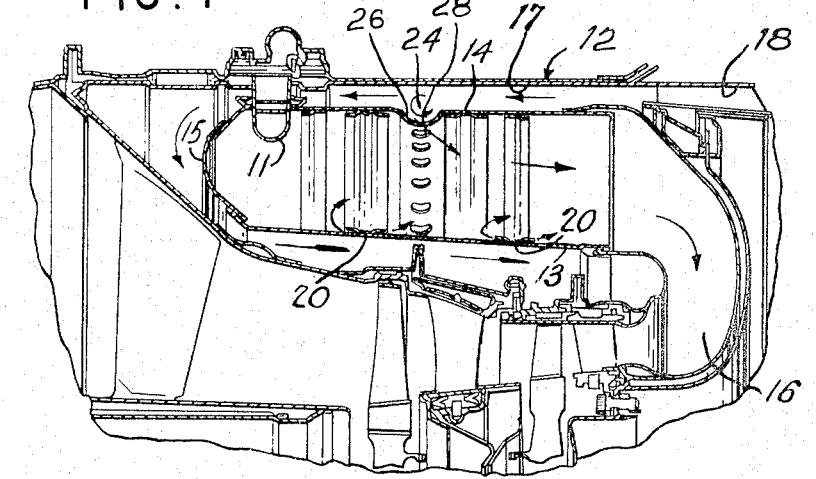
FIGURE 2 is a longitudinal partial cross-section taken along the centerline of a typical turbine engine showing in particular part of the combustion chamber casing in FIGURE 1 in operation.
Figure 3:
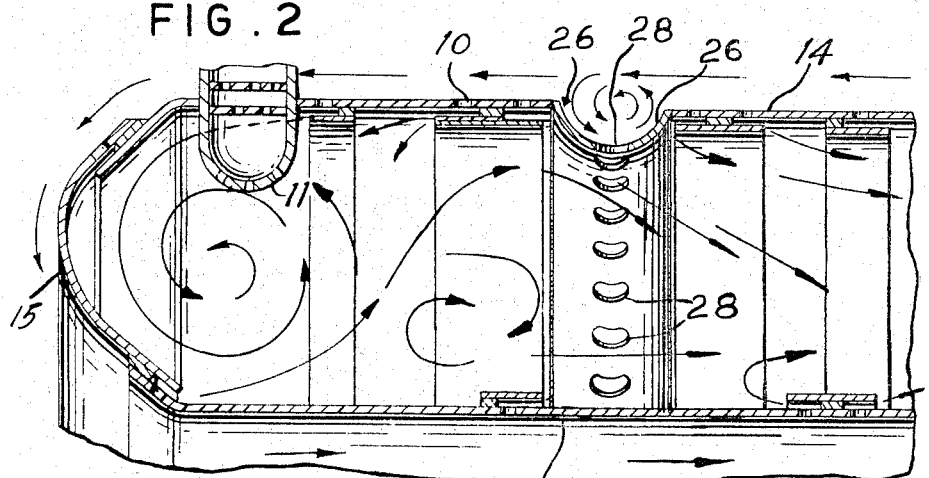
FIGURE 3 is an enlarged partial cross-section of the combustion chamber shown in FIGURE 1.

Referring now to the drawings and specifically to FIGURE 1, an annular reverse-flow type combustion chamber 10 is shown having concentric annular perforated walls 13 and 14 closed at one end by a wall 15 and communicating at the other end with a radial turbine inlet 16. In operation, annular combustion chamber 10 is axially mounted by means of fuel nozzles 11 within the gas generator case assembly 12 of the gas turbine engine shown in FIGURE 2. Combustion chamber wall 14 and gas generator casing 12 form a symmetrical annular passage 17 therebetween. Passage 17 communicates at one end with annular compressor outlet 18 in order to receive the high velocity air discharging from the centrifugal impeller of the compressor stage (not shown).

Normally, the air enters through the perforations 28a shown in FIGURE 4. While combustion is going on in the combustion chamber, a flow is created forcing the combusted gases and air towards the turbine inlet 16. However, as the air enters perforations 28a, it enters at an angle to the vertical centerline of the perforations 28a but in the same direction as the flow in passage 17 from which it was diverted. Therefore, the air enters the combustion chamber in contra-flow to the flow of combusted gases in the combustion chamber 10. This situation causes the incoming air to form turbulence in the combustion chamber mainly in the form of vortices, thereby affecting the flow to the turbine inlet 16.

In order to overcome the undesirable turbulence, at least one annular recess 24 having a concave or otherwise curved wall portion 26 is provided in the wall 14. At predetermined locations in the curved wall portion, apertures 28 are provided in the concave wall portion 26.

In operation, part of the high velocity air passing through passages 17 forms a vortex in the annular recess 24. As the air flowing in the so-formed vortex passes over the apertures 28, some of the air is diverted tangentially into the combustion chamber 10 through apertures 28. Since the air flow at the bottom of the vortex is in a direction upstream relative to the flow in passage 17, the air being diverted into the combustion chamber is, therefore, in a reverse direction relative thereto, but at an angle to the vertical centerline of the aperture 28, the position of aperture 28 determining the angle of discharge. The air is therefore in substantially the same direction as the flow in the combustion chamber 10. The jet-like action of the air entering the combustion chamber 10 in the same direction as the flow therein eliminates the vortices in the combustion chamber formed by the air entering conventional perforations. Therefore, a smooth flow is caused to enter the turbine inlet 16.

I claim:
1. A combustion chamber comprising radially spaced-apart cylindrical concentric walls and an end wall extending therebetween, means for directing a flow of air along the outer wall in a longitudinal direction, means provided in said outer wall for causing part of the flow of air to form a vortex, and means diverting air from said vortex to enter said combustion chamber whereby the direction of said diverted air is reversed relative to said flow of air.
2. A combustion chamber as claimed in claim 1 wherein said means provided for causing part of the flow of air to form a vortex is a concave annular recess extending normal to the flow.

3. A unit for jet engines as defined in claim 2 wherein said annular recess is concave in cross-section in the form of a continuous annular recess provided in said outer wall extending normal to the flow of air.

4. A combustion chamber comprising a hollow body having a smooth wall, means for directing a flow of fluid along said wall, a second wall spaced outwardly of said wall and defining a flow path therebetween, said first wall provided with a portion forming a concave recess extending normally of said flow path, said recess being shaped to cause the formation of a vortex therein, port means spaced along said recess wall to divert flow from said so-formed vortex to within said hollow body in a direction reversed from said flow path.

5. A gas turbine engine, an axially extending cylindrical wall portion, an annular combustion chamber mounted within said cylindrical wall but spaced therefrom and forming an annular passage therebetween, means for forcing a fluid stream through said passage, an annular concave recess formed on said combustion chamber and extending in a direction normal to said fluid stream, said concave recess causing a fluid vortex to be formed within said recess, spaced-apart inlet ports provided along the apex of said recess, said ports diverting a portion of said fluid in said so-formed vortex to within said combustion chamber in a direction reversed from said fluid stream.

6. A method for smoothing the flow in a reverse-flow combustion chamber having the shape of an elongated annulus comprising the steps of directing air along the outside of the combustion chamber at a direction opposite of the flow in the combustion chamber trapping part of said air and causing it to form a vortex, diverting some of said air from the vortex tangentially into the combustion chamber thereby impinging said air on said flow in the combustion chamber at an angle thereto but in the same direction as the flow.

References Cited
UNITED STATES PATENTS

| | | | |
|---|---|---|---|
| 2,243,467 | 5/1941 | Jendrassik | 60—39.65 |
| 2,659,201 | 11/1953 | Krejci | 60—39.65 |
| 2,894,703 | 7/1959 | Hazen | 137—81.5 X |
| 2,907,171 | 10/1959 | Lysholm | 60—39.65 |
| 2,910,830 | 11/1959 | White | 60—39.77 |

MARK NEWMAN, *Primary Examiner.*

RALPH D. BLAKESLEE, *Examiner.*

UNITED STATES PATENT OFFICE
CERTIFICATE OF CORRECTION

Patent No. 3,333,414                        August 1, 1967

John A. Saintsbury

It is hereby certified that error appears in the above numbered patent requiring correction and that the said Letters Patent should read as corrected below.

In the heading to the printed specification, lines 5 and 6, for "Quebec, Quebec, Canada" read -- Longueuil, Quebec, Canada --.

Signed and sealed this 26th day of November 1968.

(SEAL)
Attest:

Edward M. Fletcher, Jr.                              EDWARD J. BRENNER
Attesting Officer                                        Commissioner of Patents